United States Patent
Que et al.

(10) Patent No.: US 8,553,174 B2
(45) Date of Patent: Oct. 8, 2013

(54) LIQUID CRYSTAL DISPLAY AND BACKLIGHT MODULE AND BACK PLATE ASSEMBLY THEREOF

(75) Inventors: Vincent Que, Shenzhen (CN); Yuchun Hsiao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 128 days.

(21) Appl. No.: 13/377,541

(22) PCT Filed: Oct. 31, 2011

(86) PCT No.: PCT/CN2011/081548
§ 371 (c)(1),
(2), (4) Date: Dec. 10, 2011

(87) PCT Pub. No.: WO2013/037158
PCT Pub. Date: Mar. 21, 2013

(65) Prior Publication Data
US 2013/0070178 A1    Mar. 21, 2013

(30) Foreign Application Priority Data
Sep. 15, 2011 (CN) .......................... 2011 2 0345701

(51) Int. Cl.
*G02F 1/1333* (2006.01)
*G02F 1/1335* (2006.01)

(52) U.S. Cl.
USPC .................................. 349/58; 349/61; 349/65

(58) Field of Classification Search
USPC ................................................ 349/58, 61, 65
See application file for complete search history.

(56) References Cited

U.S. PATENT DOCUMENTS

| 6,147,724 | A  | * | 11/2000 | Yoshii et al. ..................... | 349/62 |
| 6,388,722 | B1 | * | 5/2002 | Yoshii et al. ..................... | 349/62 |
| 7,422,358 | B2 | * | 9/2008 | Weng et al. ..................... | 362/633 |
| 7,561,225 | B2 | * | 7/2009 | Nakagawa et al. ............. | 349/60 |
| 2011/0090426 | A1 | * | 4/2011 | Choi et al. ...................... | 349/65 |

* cited by examiner

*Primary Examiner* — Mike Qi

(57) ABSTRACT

A back plate assembly includes a heat dissipating member and a back cover. The heat dissipating member includes a base plate for mounting a light guide plate and a side plate for mounting a LED light source. The base plate extends along a first direction, and includes a first surface facing a display and a second surface opposite to the first surface. The side plate is connected to the base plate, and extends along a second direction perpendicular to the first direction. The back cover is disposed on the base plate and is made of plastic material. The back cover includes a third surface facing the display and coplanar with or higher than the first surface. With the present disclosure, the manufacturing cost of the light guide plate is reduced and no complicated fixing structures are required to fix the light guide plate on the back plate.

20 Claims, 2 Drawing Sheets

LIQUID CRYSTAL DISPLAY AND BACKLIGHT MODULE AND BACK PLATE
ASSEMBLY THEREOF

BACKGROUND

1. Technical Field

The present disclosure relates to liquid crystal televisions, and particularly, to a liquid crystal display and a backlight module and a back plate assembly thereof.

2. Description of Related Art

Backlight modules can be used for providing light sources and are important components in a product with a liquid crystal display. The backlight module often includes a light source, a light guide plate, an optical film, a back plate, and a heat dissipating member. The light source is disposed on one side of the light guide plate. The light guide plate and the optical film are arranged in order on the back plate. And the heat dissipating member is disposed inside a housing of the backlight module.

Since the heat dissipating member is received inside the housing and cannot absorb the expanding and shrinking change of the light guide plate, thus, the light guide plate cannot be fixed stably. A fixing structure is often used for fixing the light guide plate. Since the light guide plate easily expands and shrinks due to the change of the environmental temperature, therefore, a space is defined in the light guide plate to allow the light guide plate to expand and shrink. In order to obtain a suitable optical coupling distance, the light guide plate is provided with at least one recess or protrusion to engage with the fixing structure. In this state, a traveling path of the light is changed when the light meets the recess or the protrusion when traveling in the light guide plate. As a result, the brightness of the light guide plate may become non-uniform. Additionally, the manufacturing cost and the manufacturing time are accordingly increased due to the fixing structure.

Therefore, there is room for improvement.

SUMMARY

The present disclosure provides a back plate assembly. The back plate assembly includes a heat dissipating member and a back cover. The heat dissipating member includes a base plate for mounting a light guide plate and a side plate for mounting a light emitting diode (LED) light source. The base plate extends along a first direction, and includes a first surface facing a display and a second surface opposite to the first surface. The side plate is connected to the base plate, and extends along a second direction perpendicular to the first direction. The back cover is disposed on the base plate and made of plastic material. The back cover includes a third surface facing the display and being coplanar with the first surface or higher than the first surface.

Preferably, the back cover is disposed on the first surface or the back cover extends from the base plate along the second direction.

Preferably, the back cover is screwed, bonded, or clamped to the heat dissipating member.

Preferably, an expanding and shrinking rate of the back cover is the same as that of the light guide plate.

Preferably, the back cover is made of acrylonitrile butadiene styrene or polycarbonate.

Preferably, the base plate includes a first supporting arm connected to the side plate and a second supporting arm connected to one end of the first supporting arm which is away from the side plate via a curved portion, the back cover extends from one side of the curved portion which is away from the side plate along the second direction, the first supporting arm includes a first side facing away from the display, the second supporting arm includes a second side facing the display, the third surface of the back cover is coplanar with the second side of the second supporting arm, and the back cover further includes a forth surface facing away from the display and coplanar with the first side of the first side of the first supporting arm.

The present disclosure further provides a backlight module. The backlight module includes a back plate assembly, a LED light source, a light guide plate, and an optical film mounted on the light guide plate. The back plate assembly includes a heat dissipating member and a back cover. The heat dissipating member includes a base plate for mounting a light guide plate and a side plate for mounting a LED light source. The base plate extends along a first direction, and includes a first surface facing a display and a second surface opposite to the first surface. The side plate is connected to the base plate, and extends along a second direction perpendicular to the first direction. The back cover is disposed on the base plate and made of plastic material. The back cover includes a third surface facing the display and being coplanar with the first surface or higher than the first surface. The LED light source is mounted on the side plate. The light guide plate is mounted on the base plate and back cover. The optical film is mounted on the light guide plate.

Preferably, the back cover is disposed on the first surface of the base plate, or the back cover extends from the base plate along the second direction.

Preferably, an expanding and shrinking rate of the back cover is the same as that of the light guide plate.

Preferably, the back cover is made of acrylonitrile butadiene styrene or Polycarbonate.

Preferably, the base plate includes a first supporting arm connected to the side plate and a second supporting arm connected to one end of the first supporting arm which is away from the side plate via a curved portion, the back cover extends from one side of the curved portion which is away from the side plate along the second direction, the first supporting arm includes a first side facing away from the display, the second supporting arm includes a second side facing the display, the third surface of the back cover is coplanar with the second side of the second supporting arm, and the back cover further includes a forth surface facing away from the display and coplanar with the first side of the first side of the first supporting arm.

Preferably, the LED light source includes a printed circuit board disposed on one side of the side plate facing the display and a light emitting diode disposed on the printed circuit board.

Preferably, the back cover is screwed, bonded, or clamped to the heat dissipating member.

The present disclosure further yet provides a liquid crystal display. The liquid crystal display includes a backlight module. The backlight module includes a back plate assembly, a back cover, a LED light source, a light guide plate, and an optical film mounted on the light guide plate. The back plate assembly includes a heat dissipating member and a back cover. The heat dissipating member includes a base plate for mounting a light guide plate and a side plate for mounting a LED light source. The base plate extends along a first direction, and includes a first surface facing a display and a second surface opposite to the first surface. The side plate is connected to the base plate, and extends along a second direction perpendicular to the first direction. The back cover is disposed on the base plate and made of plastic material. The back cover includes a third surface facing the display and being coplanar with the first surface or higher than the first surface. The LED light source is mounted on the side plate. The light guide plate is mounted on the base plate and back cover. The optical film is mounted on the light guide plate.

Preferably, the back cover is disposed on the first surface or the back cover extends from the base plate along the second direction.

Preferably, the base plate includes a first supporting arm connected to the side plate and a second supporting arm connected to one end of the first supporting arm which is away from the side plate via a curved portion, the back cover extends from one side of the curved portion which is away from the side plate along the second direction, the first supporting arm includes a first side facing away from the display, the second supporting arm includes a second side facing the display, the third surface of the back cover is coplanar with the second side of the second supporting arm, and the back cover further includes a forth surface facing away from the display and coplanar with the first side of the first side of the first supporting arm.

Preferably, the back cover is screwed, bonded, or clamped to the heat dissipating member.

Preferably, the LED light source includes a printed circuit board disposed on one side of the side plate facing the display and a light emitting diode disposed on the printed circuit board.

Preferably, an expanding and shrinking rate of the back cover is the same as that of the light guide plate.

Preferably, the back cover is made of acrylonitrile butadiene styrene or polycarbonate.

In the present disclosure, the LED light source is disposed on the heat dissipating member to dissipate the heat generated by the heat dissipating member easily. Also, the light guide plate is dispose on the back cover to allow the light guide plate and the back cover to expand and shrink simultaneously. Thus, the light guide plate can be mounted to the back cover directly, and no space is needed to define between the light guide plate and the back plate to allow the light guide plate to expand or shrink when the light guide plate. Since the light guide plate is rectangular and can be connected to the base plate easily, therefore, no other complicated fixing structures are needed to fix the light guide plate to the base plate, which reduces the manufacturing cost of the light guide plate, simplifies the fixing structure, improves the stability of the optical coupling distance of the light guide plate, and avoids the situation where the brightness of the light guide plate becomes non-uniform for the fixing structure of the light guide plate.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
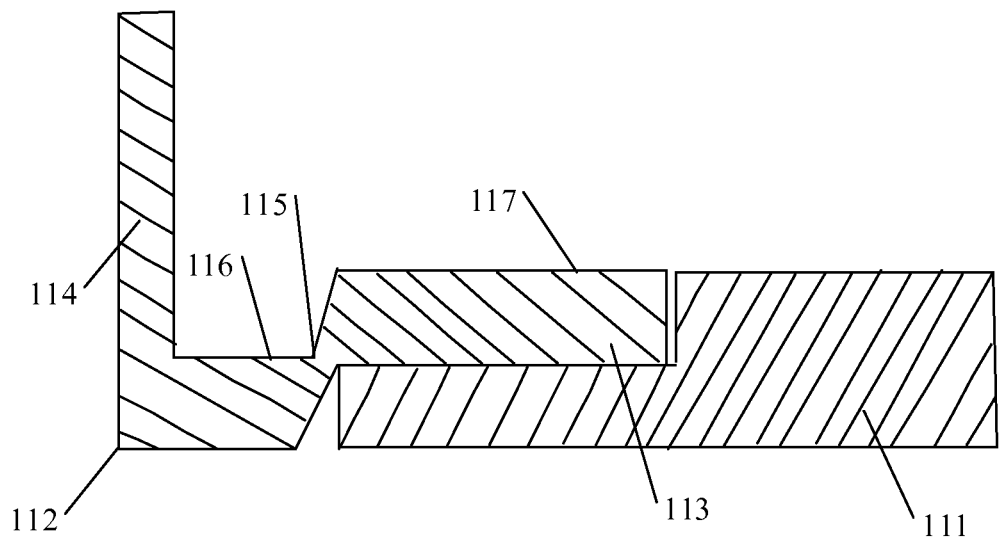
FIG. 1 is a schematic view of a back plate assembly in accordance with a first embodiment of the present disclosure.

Referring to FIG. 1, in a first embodiment, a back plate assembly 110 includes a back cover 111 and a heat dissipating member 112.

Figure 2:
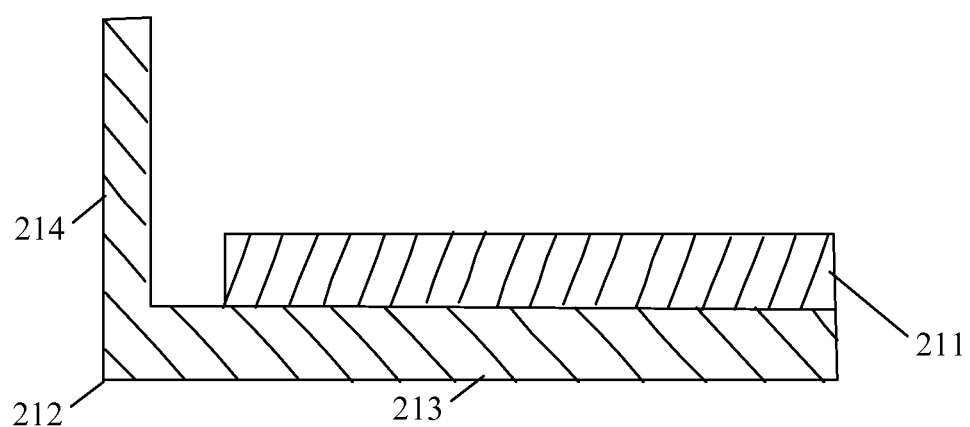
FIG. 2 is a schematic view of a back plate assembly in accordance with a second embodiment of the present disclosure.

Referring also to FIG. 2, the heat dissipating member 112 includes an L shaped base plate 113 for mounting a light guide plate and an L shaped side plate 114 connected to the base plate 113. The side plate 114 extends along a first direction and the base plate 113 extends along a second direction perpendicular to the first direction. The base plate 113 includes a first surface facing a display and a second surface opposite to the first surface. The base plate 113 further includes a first supporting arm 116, a second supporting arm 117, and a curved portion 115 disposed between the first and second supporting arms 116, 117 for connecting the first and second supporting arms 116, 117. The first supporting arm 116 is connected to the side plate 114 and a second supporting arm 117 connected to one end of the first supporting arm 116 which is away from the side plate 114. The distance between the display and the second supporting arm 117 along the first direction is smaller than the distance between the display and the first supporting arm 116, thus, the second supporting arm 117 is allowed to be connected to the back cover 111. The first supporting arm 116 includes a first side facing away from the display and the second supporting arm 117 includes a second side facing the display.

The back cover 111 is disposed on the base plate 113 of the heat dissipating member 112. Specifically, the back cover 111 protrudes from one side of the base plate 113 which is away from the side plate 114. The back cover 111 is made of plastic material such as acrylonitrile butadiene styrene (ABS) and Polycarbonate (PC) and an expanding and shrinking rate thereof is the same as that of the light guide plate received therein. It is noted that in the embodiment, the back cover 111 may be screwed, bonded, or clamped to the heat dissipating member 112. The back cover 111 includes a third surface facing the display and a forth surface opposite to the third surface. The third surface is coplanar with the second side of the second supporting arm 117, and the forth surface is coplanar with the first side of the first supporting arm 116. In this way, the light guide plate is capable of being disposed on the back cover 111.

It is noted that in other embodiments, the third surface may be higher than the first surface to allow the light guide plate to be fixed on the back cover 111 or received in the receiving space defined by the back cover 111.

Referring to FIG. 2, in a second embodiment, a back plate assembly includes an L shaped back cover 211 and L shaped heat dissipating member 212 connected to the back cover 211. The heat dissipating member 212 includes a base plate 213 for mounting a light guide plate and a side plate 214 for mounting a light emitting diode (LED) light source. The side plate 214 extends along a first direction and the base plate 213 extends along a second direction perpendicular to the first direction. The base plate 213 includes a first surface facing a display and a second surface opposite to the first surface.

The back cover 211 includes a third surface facing the display and a forth surface facing away from the display. The forth surface is connected to the first surface of the base plate 213. In the embodiment, the forth surface can be screwed, bonded, or clamped to the first surface of the base plate 123.

The back cover 211 is disposed on the base plate 213 of the heat dissipating member 212. Specifically, the back cover 211 protrudes from one side of the base plate 213 which is away from the side plate 214. The back cover 211 is made of plastic material such as ABS and PC and an expanding and shrinking rate thereof is the same as that of the light guide plate received therein. It is noted that in the embodiment, the back cover 211 may be screwed, bonded, or clamped to the heat dissipating member 112. The back cover 211 includes a third surface for mounting a light guide plate and a forth surface opposite to the third surface.

In the back plate assembly of the first and second embodiments, the back cover is disposed on the first surface of the base plate facing the display or received in the receiving space defined by the back cover, thus, the heat generated by the LED light source can be dissipated effectively. Also, the light guide plate is disposed on the back cover to allow the light guide plate and the back cover to expand and shrink simultaneously. Thus, the light guide plate can be mounted to the back cover directly, and no space is needed to define between the light guide plate and the back plate to allow the light guide plate to expand or shrink when the light guide plate. Since the light guide plate is rectangular and can be connected to the base plate easily, therefore, no other complicated fixing structures are needed to fix the light guide plate on the base plate, which reduces the manufacturing cost of the light guide plate, simplifies the fixing structure, improves the stability of the optical coupling distance of the light guide plate, and avoids the situation where the brightness of the light guide plate becomes non-uniform for the fixing structure of the light guide plate.

Figure 3:
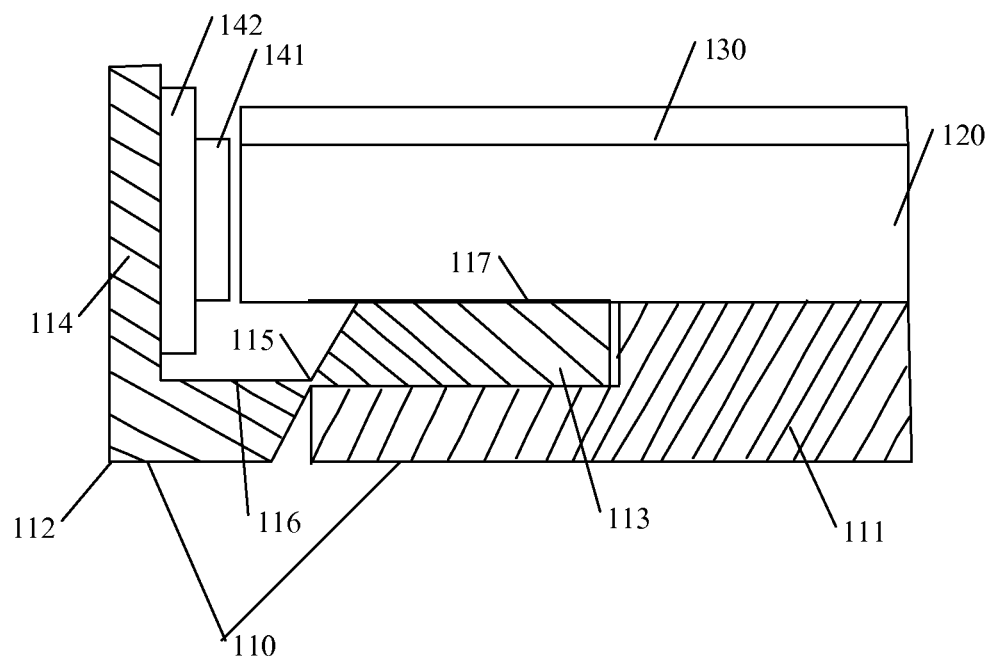
FIG. 3 is a schematic view of a backlight module of the back plate assembly of FIG. 1.

The present disclosure further provides a backlight module. Referring to FIG. 3, in a first embodiment, a backlight module includes a LED light source, a back plate assembly 110, a light guide plate 120, and an optical film 130.

The back plate assembly 110 includes a heat dissipating member 112 and a back cover 111 cooperating with the heat dissipating member 112 to define a receiving space for receiving the light guide plate 120. In some embodiments, the back cover 111 may by itself define the receiving space for receiving the light guide plate 120.

The heat dissipating member 112 includes an L shaped base plate 113 with a light guide plate 120 mounted thereof and an L shaped side plate 114 connected to the base plate 113. The side plate 114 extends along a first direction and the base plate 113 extends along a second direction perpendicular to the first direction. The base plate 113 includes a first surface facing a display and a second surface opposite to the first surface. The base plate 113 further includes a first supporting arm 116, a second supporting arm 117, and a curved portion 115 disposed between the first and second supporting arms 116, 117 for connecting the first and second supporting arms 116, 117. The first supporting arm 116 is connected to the side plate 114 and a second supporting arm 117 connected to one end of the first supporting arm 116 which is away from the side plate 114. The distance between the display and the second supporting arm 117 along the first direction is smaller than the distance between the display and the first supporting arm 116, thus, the second supporting arm 117 is allowed to be connected to the back cover 111. The first supporting arm 116 includes a first side facing away from the display and the second supporting arm 117 includes a second side facing the display.

The back cover 111 is disposed on the base plate 113 of the heat dissipating member 112. Specifically, the back cover 111 protrudes from one side of the base plate 113 which is away from the side plate 114. The back cover 111 is made of plastic material such as ABS and PC and an expanding and shrinking rate thereof is the same as that of the light guide plate received therein. It is noted that in the embodiment, the back cover 111 may be screwed, bonded, or clamped to the heat dissipating member 112. The back cover 111 includes a third surface facing the display and a forth surface opposite to the third surface. The third surface is coplanar with the second side of the second supporting arm 117, and the forth surface is coplanar with the first side of the first supporting arm 116. In this way, the light guide plate is capable of being disposed on the back cover 111.

The LED light source includes a printed circuit board (PCB) 142 disposed on the side plate 114 of the heat dissipating member 112 and a LED 141 disposed on the PCB 142.

In the embodiment, the LED light source is disposed on the heat dissipating member 112 to dissipate the heat generated by the heat dissipating member 112 easily. Also, the light guide plate 120 is disposed on the back cover 111 to allow the light guide plate 120 and the back cover 111 to expand and shrink simultaneously. Thus, the light guide plate 120 can be mounted to the back cover 111 directly, and no space is needed to define between the light guide plate 120 and the back plate 110 to allow the light guide plate 120 to expand or shrink when the light guide plate. Since the light guide plate is rectangular and can be connected to the base plate easily, therefore, no other complicated fixing structures are needed to fix the light guide plate on the base plate, which reduces the manufacturing cost of the light guide plate, simplifies the fixing structure, improves the stability of the optical coupling distance of the light guide plate, and avoids the situation where the brightness of the light guide plate becomes non-uniform due to the fixing structure of the light guide plate.

Figure 4:
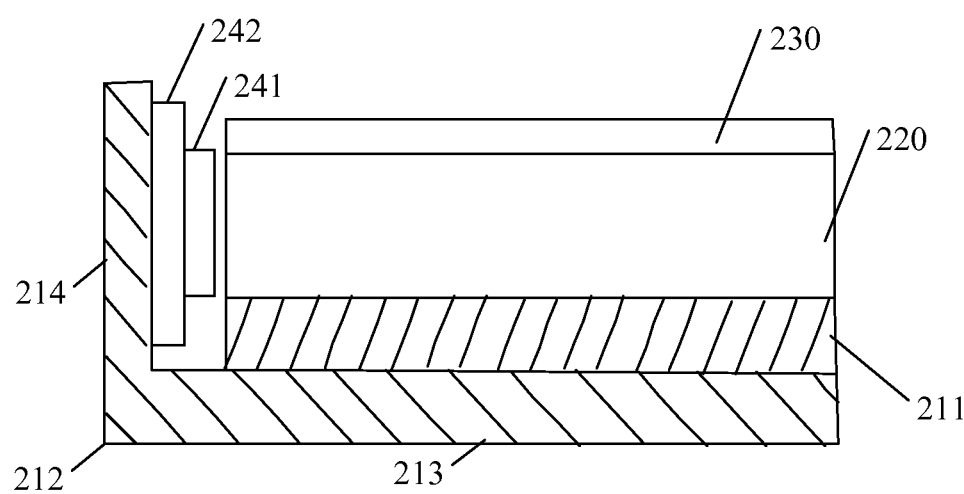
FIG. 4 is a schematic view of a backlight module of the back plate assembly of FIG. 2.

Referring to FIG. 4, in a second embodiment, a backlight module includes a LED light source, a back plate assembly, a light guide plate 220, and an optical film 230.

The back plate assembly in the second embodiment includes an L shaped back cover 211 and an L shaped heat dissipating member 212 connected to the back cover 211. The heat dissipating member 212 includes a base plate 213 for mounting a light guide plate and a side plate 214 for mounting a LED light source. The side plate 214 extends along a first direction and the base plate 213 extends along a second direction perpendicular to the first direction. The base plate 213 includes a first surface facing a display and a second surface opposite to the first surface.

The back cover 211 includes a third surface facing the display and a forth surface facing away from the display. Compared with the first embodiment, the forth surface of the back cover 211 in the embodiment is connected to the first surface of the base plate 213. In the embodiment, the forth surface can be screwed, bonded, or clamped to the first surface of the base plate 123.

In the second embodiment, the back cover is disposed on the first surface of the base plate 213 facing the display or received in the receiving space defined by the back cover, thus, the heat generated by the LED light source can be dissipated effectively. Also, the light guide plate 120 is dispose on the back cover 111 to allow the light guide plate 120 and the back cover 111 to expand and shrink simultaneously. Thus, the light guide plate 120 can be mounted to the back cover 111 directly, and no space is needed to define between the light guide plate 120 and the back plate 110 to allow the light guide plate 120 to expand or shrink when the light guide plate. Since the light guide plate is rectangular and can be connected to the base plate easily, therefore, no other complicated fixing structures are needed to fix the light guide plate on the base plate, which reduces the manufacturing cost of the light guide plate, simplifies the fixing structure, improves the stability of the optical coupling distance of the light guide plate, and avoids the situation where the brightness of the light guide plate becomes non-uniform for the fixing structure of the light guide plate.

The present disclosure further provides a liquid crystal display (LCD). The LCD includes a backlight module. The backlight module includes a LED light source, a back plate assembly, a light guide plate, and an optical film.

The back plate assembly includes a heat dissipating member and a back cover cooperating with the heat dissipating member to define a receiving space for receiving the light guide plate. In some embodiments, the back cover may by itself define the receiving space for receiving the light guide plate.

The heat dissipating member includes an L shaped base plate with a light guide plate mounted thereof and an L shaped side plate connected to the base plate. The side plate extends along a first direction and the base plate extends along a second direction perpendicular to the first direction. The base plate includes a first surface facing a display and a second surface opposite to the first surface. The base plate further includes a first supporting arm, a second supporting arm, and a curved portion disposed between the first and second supporting arms for connecting the first and second supporting arms. The first supporting arm is connected to the side plate and a second supporting arm connected to one end of the first supporting arm 116 which is away from the side plate. The distance between the display and the second supporting arm along the first direction is smaller than the distance between the display and the first supporting arm, thus, the second supporting arm is allowed to be connected to the back cover. The first supporting arm includes a first side facing away from the display and the second supporting arm includes a second side facing the display.

The back cover is disposed on the base plate of the heat dissipating member. Specifically, the back cover protrudes from one side of the base plate which is away from the side plate. The back cover is made of plastic material such as ABS and PC and an expanding and shrinking rate thereof is the same as that of the light guide plate received therein. It is noted that in the embodiment, the back cover may be screwed, bonded, or clamped to the heat dissipating member. The back cover includes a third surface facing the display and a forth surface opposite to the third surface. The third surface is coplanar with the second side of the second supporting arm, and the forth surface is coplanar with the first side of the first supporting arm. In this way, the light guide plate is capable of being disposed on the back cover.

It is noted in other embodiments, the third surface may be higher than the first surface to allow the light guide plate to be fixed on the back cover 111 or received in the receiving space defined by the back cover 111.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A back plate assembly, comprising:
a heat dissipating member comprising:
a base plate for mounting a light guide plate, the base plate extending along a first direction and comprising a first surface facing a display and a second surface opposite to the first surface; and
a side plate for mounting a LED light source, the side plate being connected to the base plate and extending along a second direction perpendicular to the first direction; and
a back cover disposed on the base plate, the back cover being made of plastic material and comprising a third surface facing the display, the third surface being coplanar with the first surface or higher than the first surface.

2. The back plate assembly as claimed in claim 1, wherein the back cover is disposed on the first surface or the back cover extends from the base plate along the second direction.

3. The back plate assembly as claimed in claim 1, wherein the back cover is screwed, bonded, or clamped to the heat dissipating member.

4. The back plate assembly as claimed in claim 3, wherein the base plate comprises a first supporting arm connected to the side plate, a second supporting arm connected to one end of the first supporting arm which is away from the side plate via a curved portion, the back cover extends from one side of the curved portion which is away from the side plate along the second direction, the first supporting arm comprises a first side facing away from the display, the second supporting arm comprises a second side facing the display, the third surface of the back cover is coplanar with the second side of the second supporting arm, and the back cover further comprises a forth surface facing away from the display and coplanar with the first side of the first supporting arm.

5. The back plate assembly as claimed in claim 1, wherein an expanding and shrinking rate of the back cover is the same as that of the light guide plate.

6. The back plate assembly as claimed in claim 5, wherein the back cover is made of acrylonitrile butadiene styrene or polycarbonate.

7. A backlight module, comprising:
a back plate assembly, comprising:
a heat dissipating member comprising a base plate for mounting a light guide plate and a side plate connected to the base plate for mounting a LED light source, the base plate extending along a first direction and the side plate extending along a second direction perpendicular to the first direction, the base plate comprising a first surface facing a display and a second surface opposite to the first surface; and
a back cover disposed on the first surface of the base plate, the back cover being made of plastic material and comprising a third surface facing the first display, the third surface being coplanar with or higher than the first surface of the base plate;
a LED light source mounted on the side plate;
a light guide plate mounted on the base plate and the back cover; and
an optical film mounted on the light guide plate.

8. The backlight module as claimed in claim 7, wherein the back cover is disposed on the first surface of the base plate, or the back cover extends from the base plate along the second direction.

9. The backlight module as claimed in claim 8, wherein the base plate comprises a first supporting arm connected to the side plate and a second supporting arm connected to one end of the first supporting arm which is away from the side plate via a curved portion, the back cover extends from one side of the curved portion which is away from the side plate along the second direction, the first supporting arm comprises a first side facing away from the display, the second supporting arm comprises a second side facing the display, the third surface of the back cover is coplanar with the second side of the second supporting arm, and the back cover further comprises a forth surface facing away from the display and coplanar with the first side of the first side of the first supporting arm.

10. The backlight module as claimed in claim 7, wherein an expanding and shrinking rate of the back cover is the same as that of the light guide plate.

11. The backlight module as claimed in claim 10, wherein the back cover is made of acrylonitrile butadiene styrene or Polycarbonate.

12. The backlight module as claimed in claim 7, wherein the LED light source comprises a printed circuit board disposed on one side of the side plate facing the display and a light emitting diode disposed on the printed circuit board.

13. The backlight module as claimed in claim 7, wherein the back cover is screwed, bonded, or clamped to the heat dissipating member.

14. A liquid crystal display comprising a backlight module, the backlight module comprising:
   a back plate assembly, comprising:
      a heat dissipating member comprising a base plate for mounting a light guide plate and a side plate connected to the base plate for mounting a LED light source, the base plate extending along a first direction and the side plate extending along a second direction perpendicular to the first direction, the base plate comprising a first surface facing a display and a second surface opposite to the first surface; and
      a back cover disposed on the first surface of the base plate, the back cover being made of plastic material and comprising a third surface facing the first display, the third surface being coplanar with or higher than the first surface of the base plate;
   a LED light source mounted on the side plate;
   a light guide plate mounted on the base plate and back cover; and
   an optical film mounted on the light guide plate.

15. The liquid crystal display as claimed in claim 14, wherein the back cover is disposed on the first surface or the back cover extends from the base plate along the second direction.

16. The liquid crystal display as claimed in claim 15, wherein the base plate comprises a first supporting arm connected to the side plate and a second supporting arm connected to one end of the first supporting arm which is away from the side plate via a curved portion, the back cover extends from one side of the curved portion which is away from the side plate along the second direction, the first supporting arm comprises a first side facing away from the display, the second supporting arm comprises a second side facing the display, the third surface of the back cover is coplanar with the second side of the second supporting arm, and the back cover further comprises a forth surface facing away from the display and coplanar with the first side of the first supporting arm.

17. The liquid crystal display as claimed in claim 15, wherein the back cover is screwed, bonded, or clamped to the heat dissipating member.

18. The liquid crystal display as claimed in claim 15, wherein the LED light source comprises a printed circuit board disposed on one side of the side plate facing the display and a light emitting diode disposed on the printed circuit board.

19. The liquid crystal display as claimed in claim 14, wherein an expanding and shrinking rate of the back cover is the same as that of the light guide plate.

20. The liquid crystal display as claimed in claim 19, wherein the back cover is made of acrylonitrile butadiene styrene or polycarbonate.

\* \* \* \* \*